US012170852B2

(12) United States Patent
Oko

(10) Patent No.: US 12,170,852 B2
(45) Date of Patent: Dec. 17, 2024

(54) IMAGE PROCESSING APPARATUS

(71) Applicant: SUBARU CORPORATION, Tokyo (JP)

(72) Inventor: Akitaka Oko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 46 days.

(21) Appl. No.: 18/116,576

(22) Filed: Mar. 2, 2023

(65) Prior Publication Data

US 2023/0300473 A1  Sep. 21, 2023

(30) Foreign Application Priority Data

Mar. 17, 2022 (JP) .................. 2022-042423

(51) Int. Cl.
H04N 23/80 (2023.01)
G06T 7/174 (2017.01)
H04N 23/90 (2023.01)
H05B 7/02 (2006.01)

(52) U.S. Cl.
CPC ............ H04N 23/80 (2023.01); G06T 7/174 (2017.01); H04N 23/90 (2023.01); H05B 7/02 (2013.01); G06T 2207/10004 (2013.01); G06T 2207/10064 (2013.01)

(58) Field of Classification Search
None
See application file for complete search history.

(56) References Cited

U.S. PATENT DOCUMENTS

| 2018/0359386 | A1  | 12/2018 | Hayashi |
| 2019/0176762 | A1* | 6/2019  | Ooji ........................ H05B 3/84 |
| 2020/0153078 | A1* | 5/2020  | Inoue ..................... H01Q 21/28 |
| 2023/0060268 | A1* | 3/2023  | Sato .................. G02B 27/0006 |
| 2023/0284345 | A1* | 9/2023  | Mori ....................... H05B 3/26 |
|              |     |         |                               219/203 |

FOREIGN PATENT DOCUMENTS

JP          2019-4252 A    1/2019

* cited by examiner

Primary Examiner — Cynthia Segura
(74) Attorney, Agent, or Firm — TROUTMAN PEPPER HAMILTON SANDERS LLP

(57) ABSTRACT

An image processing apparatus includes a sub-image generation unit, a luminance ratio map generation unit, and an electric heating wire pattern estimation unit. The sub-image generation unit generates sub-images by dividing a first image in a lateral direction. The first image is one of a left image and a right image that are captured by a stereo camera through a windshield provided with an electric heating wire. The luminance ratio map generation unit sequentially selects one of the sub-images and generates map data based on the selected sub-image and a second image. The map data indicates a ratio between luminance values. The second image is another of the left image and the right image. The electric heating wire pattern estimation unit performs an estimation of a wiring pattern of the electric heating wire based on the map data regarding each of the sub-images.

13 Claims, 12 Drawing Sheets

IMAGE PROCESSING APPARATUS

CROSS-REFERENCE TO RELATED APPLICATION

The present application claims priority from Japanese Patent Application No. 2022-042423 filed on Mar. 17, 2022, the entire contents of which are hereby incorporated by reference.

BACKGROUND

The disclosure relates to an image processing apparatus configured to perform image processing based on a stereo image.

Some of the vehicles such as automobiles detect an object around the vehicle based on a captured image obtained by an imaging device. In addition, some vehicles include an electric heating wire provided on a glass of a windshield or a rear window, for example, to prevent the glass from fogging up. For example, Japanese Unexamined Patent Application Publication No. 2019-004252 discloses a technique to recognize, as an electric heating wire, a portion that does not change over time in a captured image obtained by an in-vehicle camera.

SUMMARY

An aspect of the disclosure provides an image processing apparatus that includes a sub-image generation unit, a luminance ratio map generation unit, and an electric heating wire pattern estimation unit. The sub-image generation unit is configured to generate sub-images by dividing a first image in a lateral direction. The first image is one of a left image and a right image. The left image and the right image are captured by a stereo camera through a windshield provided with an electric heating wire. The luminance ratio map generation unit is configured to sequentially select one of the sub-images and generate map data based on the selected sub-image and a second image. The map data indicates a ratio between luminance values. The second image is another of the left image and the right image. The electric heating wire pattern estimation unit is configured to perform an estimation of a wiring pattern of the electric heating wire based on the map data regarding each of the sub-images.

An aspect of the disclosure provides an image processing apparatus that includes circuitry. The circuitry is configured to generate sub-images by dividing a first image in a lateral direction. The first image is one of a left image and a right image. The left image and the right image are captured by a stereo camera through a windshield provided with an electric heating wire. The circuitry is configured to sequentially select one of the sub-images and generate map data based on the selected sub-image and a second image. The map data indicates a ratio between luminance values. The second image is another of the left image and the right image. The circuitry is configured to perform an estimation of a wiring pattern of the electric heating wire based on the map data regarding each of the sub-images.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Some example embodiments of the disclosure will now be described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments that are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Regarding an image processing apparatus, it is desired to reduce an influence of an electric heating wire on a processing result of image processing based on a captured image, and it is expected to further reduce such an influence on the processing result of the image processing.

It is desirable to provide an image processing apparatus that makes it possible to reduce an influence of an electric heating wire on a processing result of image processing based on a captured image.

Figure 1:
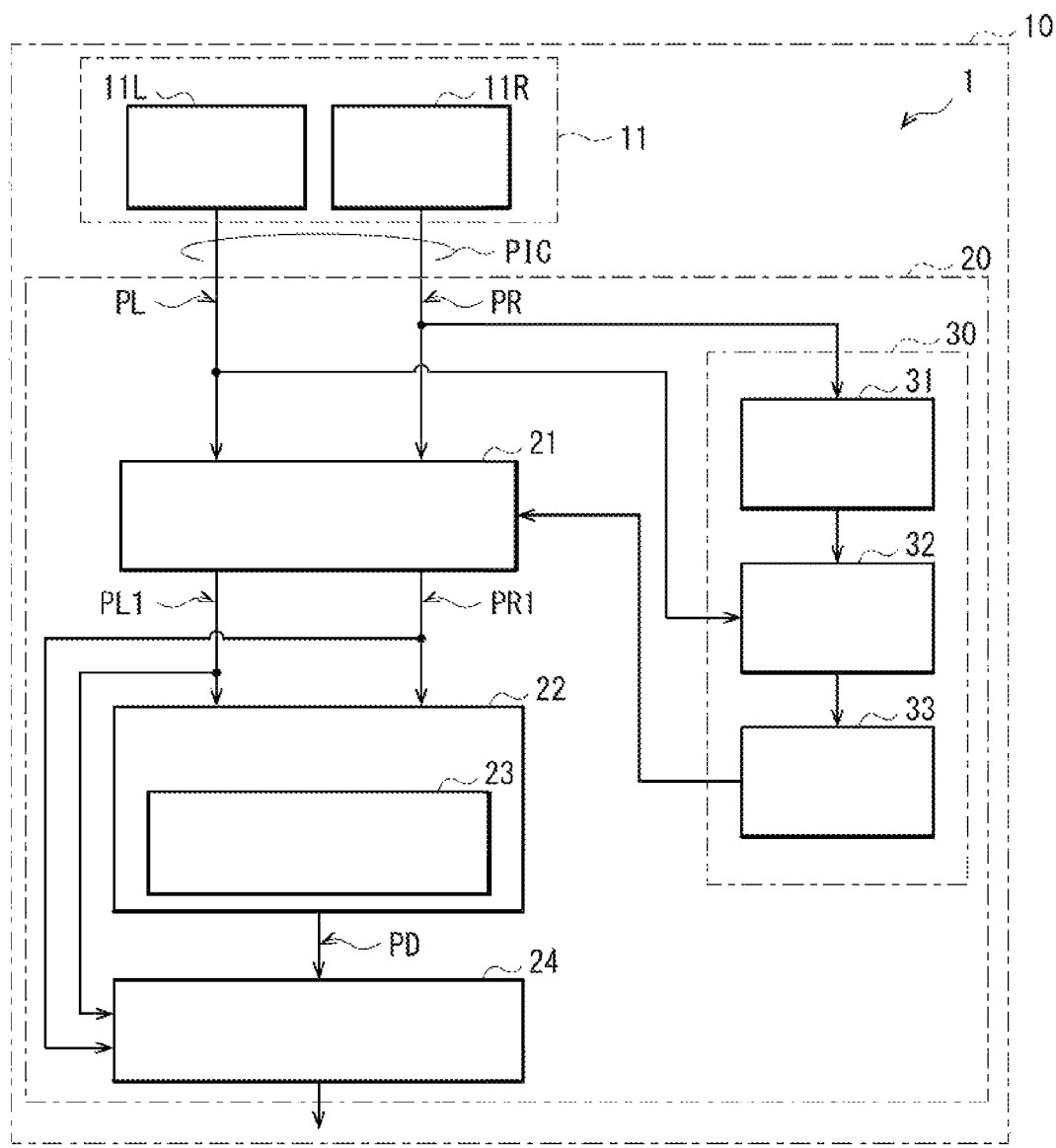
FIG. 1 is a block diagram illustrating a configuration example of an image processing apparatus according to an example embodiment of the disclosure.

FIG. 1 illustrates a configuration example of an image processing apparatus (an image processing apparatus 1) according to an example embodiment of the disclosure. The image processing apparatus 1 may include a stereo camera 11 and a processor 20. In this example, the image processing apparatus 1 may be mounted on a vehicle 10. The vehicle 10 may be an automobile, for example.

The stereo camera 11 may capture images of an environment in front of the vehicle 10 and thereby generate a set of images having different parallaxes. The set of images may include a left image PL and a right image PR. The stereo camera 11 may include a left camera 11L and a right camera 11R. The left camera 11L and the right camera 11R may each include a lens and an image sensor.

Figure 2:
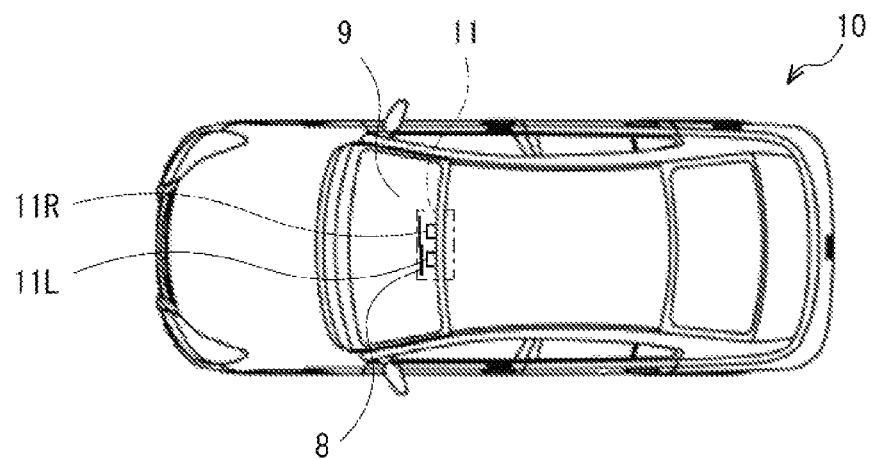
FIG. 2 is an explanatory diagram illustrating an example of disposing a stereo camera illustrated in FIG. 1.

FIG. 2 illustrates an example of disposing the stereo camera 11 in the vehicle 10. In this example, the left camera 11L and the right camera 11R may be disposed inside the vehicle 10, in the vicinity of an upper portion of a windshield 9 of the vehicle 10. The left camera 11L and the right camera 11R may be spaced from each other by a predetermined distance in a width direction of the vehicle 10. The left camera 11L may generate the left image PL, and the right camera 11R may generate the right image PR. The left image PL and the right image PR may provide a stereo image PIC. The stereo camera 11 may perform an imaging operation at a predetermined frame rate and thereby generate a series of stereo images PIC. The predetermined frame rate may be 60 fps, for example. The stereo camera 11 may supply the generated stereo images PIC to the processor 20.

The windshield 9 may be provided with an electric heating wire 8 at a portion in front of the left camera 11L and the right camera 11R. The electric heating wire 8 may generate heat by a current flowing from an unillustrated driving circuit. In the vehicle 10, such heat generation of the electric heating wire 8 may prevent the windshield 9 from fogging up.

Figure 3:
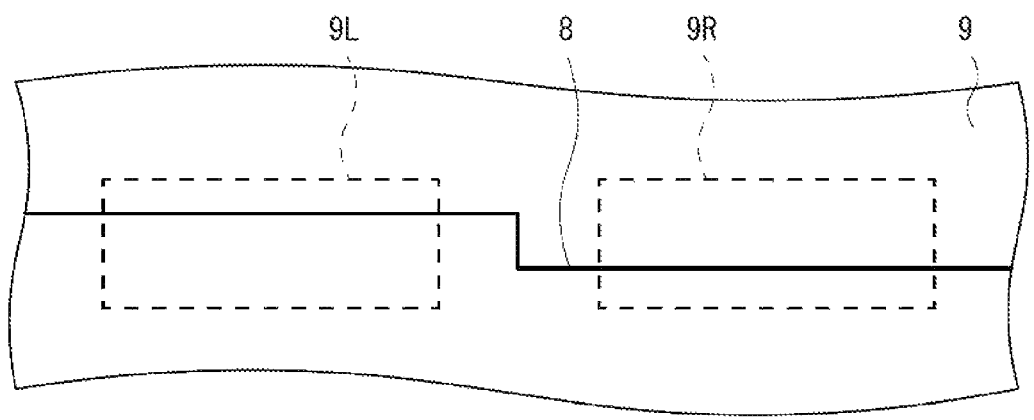
FIG. 3 is an explanatory diagram illustrating an example of a wiring pattern of an electric heating wire illustrated in FIG. 2.

FIG. 3 illustrates an example of a wiring pattern of the electric heating wire 8 on the windshield 9. FIG. 3 illustrates the wiring pattern of the electric heating wire 8 from a viewpoint facing toward the front of the vehicle 10 from an inside of the vehicle 10. FIG. 3 also illustrates an imaging range 9L of the left camera 11L and an imaging range 9R of the right camera 11R.

The electric heating wire 8 may have a straight-line shape that extends in the lateral direction around the imaging range 9L. The electric heating wire 8 may also have a straight-line shape that extends in the lateral direction around the imaging range 9R. The position of the electric heating wire 8 in the imaging range 9L may be different from the position of the electric heating wire 8 in the imaging range 9R. In this example, in the imaging range 9L, the electric heating wire 8 may be provided on an upper side of the middle in an upper-lower direction in the imaging range 9L. In the imaging range 9R, the electric heating wire 8 may be provided on a lower side of the middle in an upper-lower direction in the imaging range 9R. The electric heating wire 8 around the imaging range 9L and the electric heating wire 8 around the imaging range 9R may be coupled to each other via a step-shaped wiring pattern. The step-shaped wiring pattern may be provided in a region between the imaging range 9L and the imaging range 9R. The wiring pattern of the electric heating wire 8 may thus be different between the imaging range 9L and the imaging range 9R, and the wiring pattern of the electric heating wire 8 in the imaging range 9L and the imaging range 9R may be asymmetrical.

Figure 4:
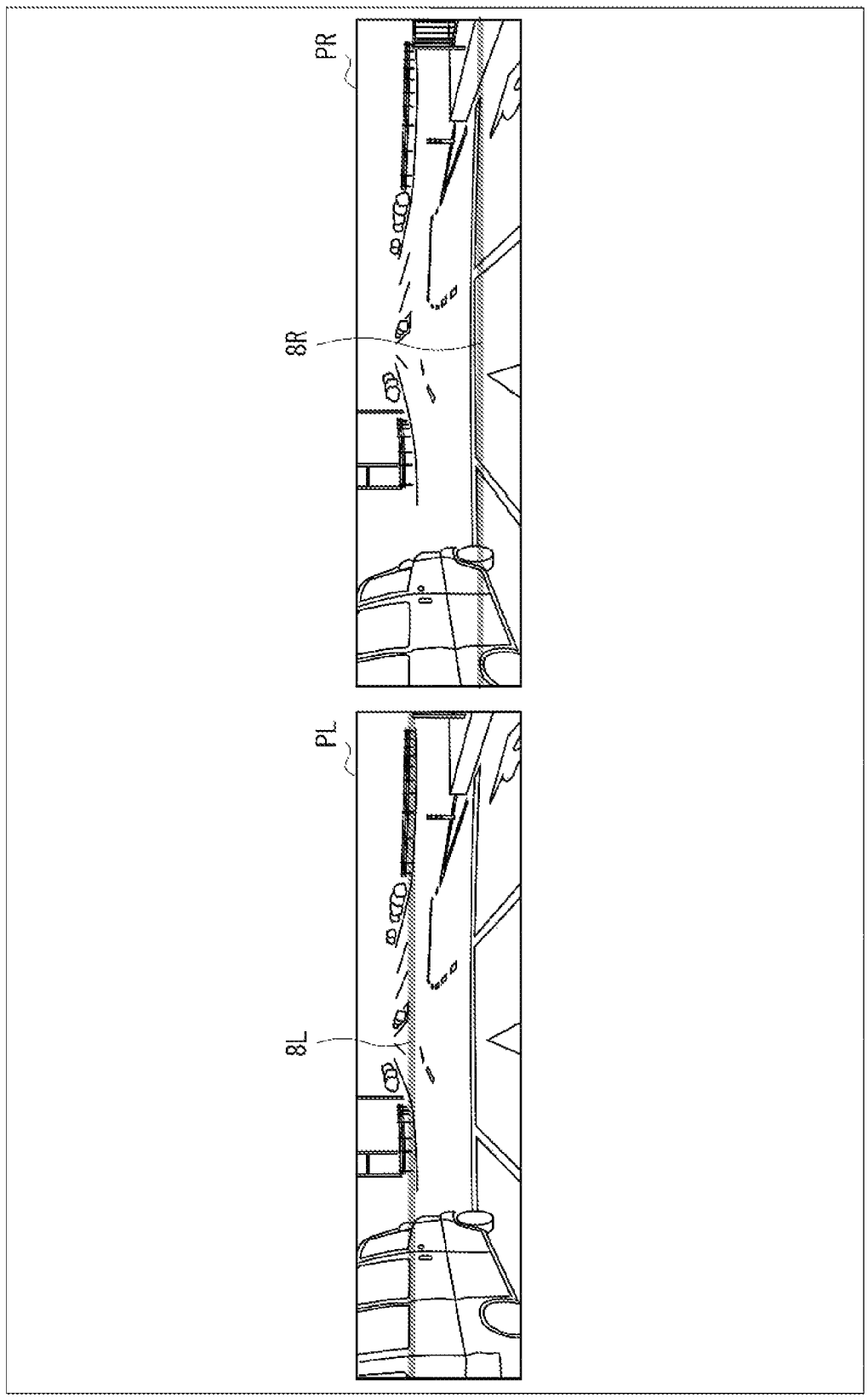
FIG. 4 is an explanatory diagram illustrating an example of a left image and a right image.

FIG. 4 illustrates an example of the left image PL and the right image PR. In this case, the left image PL generated by the left camera 11L may include a line portion 8L. The line portion 8L may be positioned on the upper side in the upper-lower direction, may extend in the lateral direction, and may have luminance lower than the luminance in a region surrounding the line portion 8L. The right image PR generated by the right camera 11R may include a line portion 8R. The line portion 8R may be positioned on the lower side in the upper-lower direction, may extend in the lateral direction, and may have luminance lower than the luminance in a region surrounding the line portion 8R. The line portions 8L and 8R having the lower luminance may be present due to the electric heating wire 8. That is, because the electric heating wire 8 partially blocks light from a subject in the line portions 8L and 8R, the luminance of the line portions 8L and 8R may be lower than the luminance in the regions surrounding the line portions 8L and 8R.

When the stereo camera 11 is attached to the vehicle 10, the direction of the stereo camera 11 can be slightly shifted.

Figure 5:
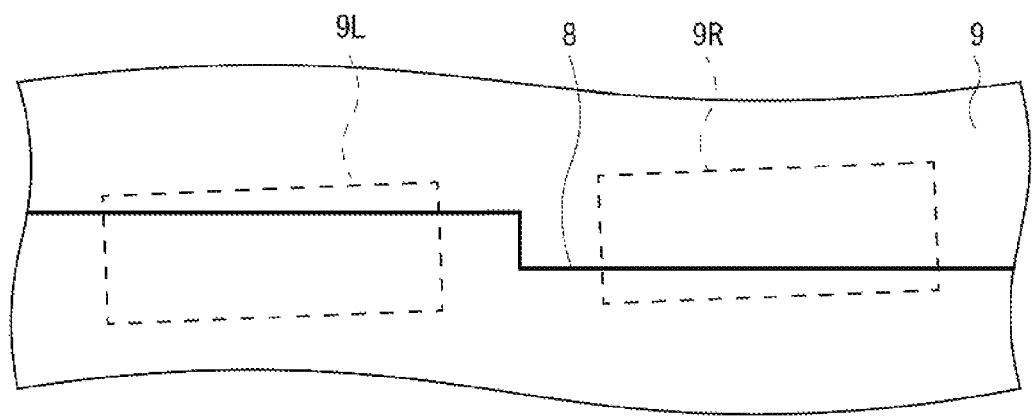
FIG. 5 is an explanatory diagram illustrating another example of the wiring pattern of the electric heating wire illustrated in FIG. 2.

FIG. 5 illustrates an example of a positional relationship between the imaging ranges 9L and 9R and the electric heating wire 8 in a case where the direction of the stereo camera 11 attached to the vehicle 10 is slightly shifted. It is to be noted that the illustration in FIG. 5 is exaggerated for a description purpose. In this example, the stereo camera 11 is attached to the vehicle 10 in such a manner that a right portion of the stereo camera 11 is slightly shifted to the upper side and a left portion of the stereo camera 11 is slightly shifted to the lower side. In this case also, the respective wiring pattern of the electric heating wire 8 may be different between the imaging range 9L and the imaging range 9R and may be asymmetrical.

Figure 6:
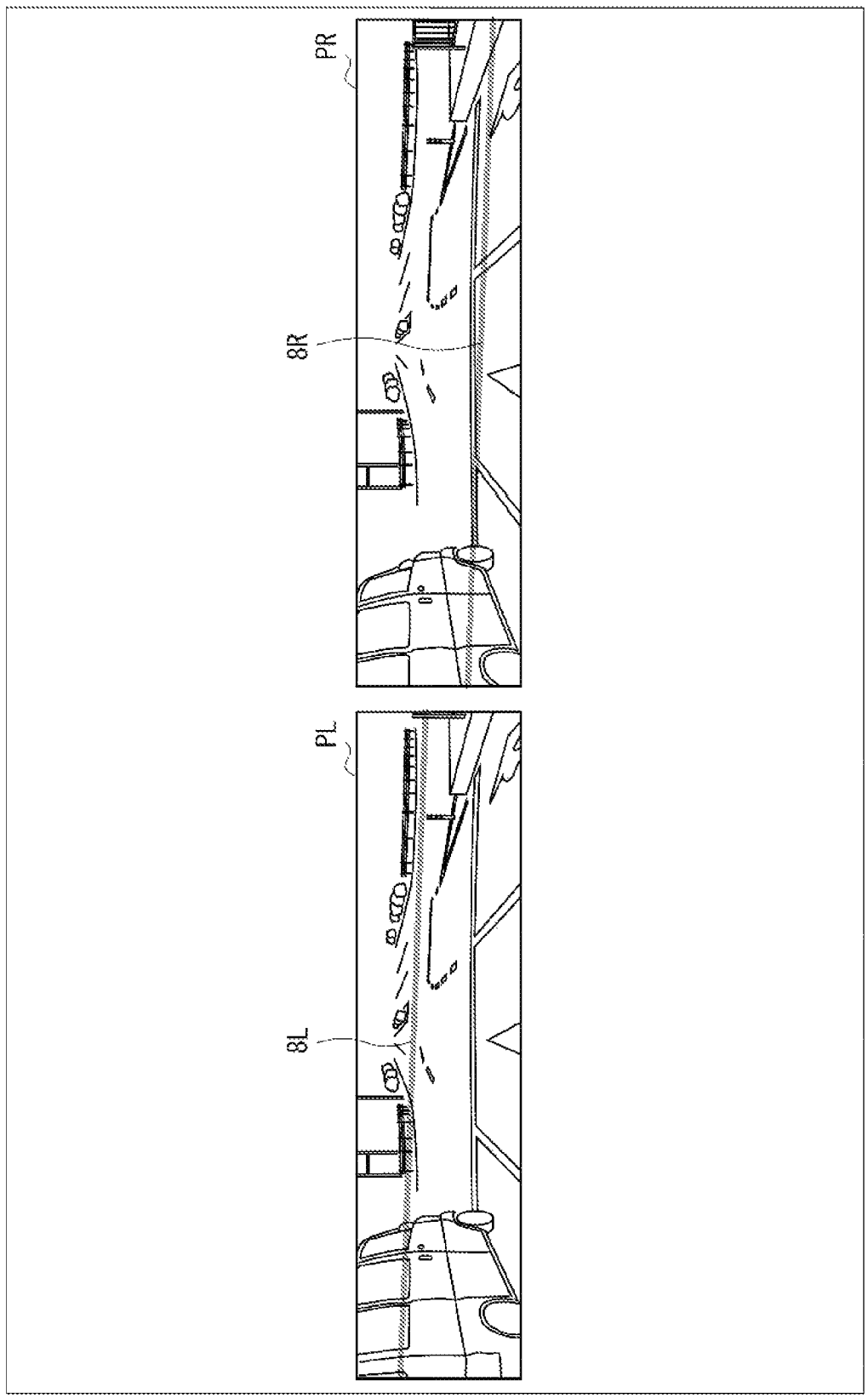
FIG. 6 is an explanatory diagram illustrating an example of the left image and the right image.

FIG. 6 illustrates an example of the left image PL and the right image PR in the case illustrated in FIG. 5. In this case, the left image PL generated by the left camera 11L includes the line portion 8L on the upper side in the upper-lower direction. The line portion 8L descends rightward and has luminance that is lower than the luminance in the region surrounding the line portion 8L. The right image PR generated by the right camera 11R includes the line portion 8R on the lower side in the upper-lower direction. The line portion 8R descends rightward and has luminance that is lower than the luminance in the region surrounding the line portion 8R.

As described above, because the windshield 9 is provided with the electric heating wire 8, the left image PL may include the line portion 8L that has the luminance lower than the luminance of the region surrounding the line portion 8L, and the right image PR may include the line portion 8R that has the luminance lower than the luminance of the region surrounding the line portion 8R. The position of the line portion 8L in the left image PL and the position of the line portion 8R in the right image PR may be different from each other and therefore not overlap with each other. The stereo camera 11 may generate such a left image PL and such a right image PR, and may supply the generated left image PL and right image PR to the processor 20.

The processor 20 illustrated in FIG. 1 may recognize an object in front of the vehicle 10 based on the stereo image PIC supplied from the stereo camera 11. For example, based on information regarding the object recognized by the processor 20, for example, a traveling control for the vehicle 10 may be performed or the information regarding the recognized object may be displayed on a console monitor. The processor 20 may include, for example, a central processing unit (CPU), a random-access memory (RAM), and a read-only memory (ROM). The CPU may execute a program. The RAM may temporarily store processing data. The ROM may store a program. The processor 20 may include an electric heating wire detection unit 30, an image correction unit 21, a parallax image generation unit 22, and an object recognition unit 24.

The electric heating wire detection unit 30 may detect the electric heating wire 8 based on the left image PL and the right image PR. The electric heating wire detection unit 30 may include a sub-image generation unit 31, a luminance ratio map generation unit 32, and an electric heating wire pattern estimation unit 33.

The sub-image generation unit 31 may generate sub-images PS by dividing the right image PR in the lateral direction. In this example, the sub-images PS may be three sub-images PSA, PSB, and PSC.

Figure 7:
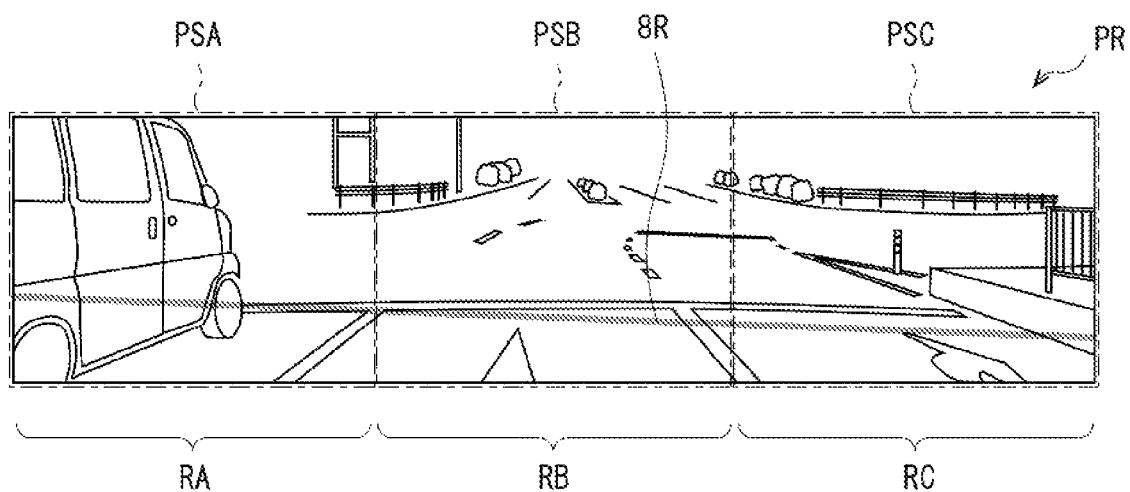
FIG. 7 is an explanatory diagram illustrating an operation example of a sub-image generation unit illustrated in FIG. 1.

FIG. 7 illustrates an operation example of the sub-image generation unit 31. In this example, an image region of the right image PR may be sectioned into three image regions R that are disposed side by side in the lateral direction. Such three image regions R may be image regions RA, RB, and RC. The sub-image generation unit 31 may generate the sub-image PSA based on an image in the image region RA included in the right image PR. The sub-image generation unit 31 may generate the sub-image PSB based on an image in the image region RB included in the right image PR. The sub-image generation unit 31 may generate the sub-image PSC based on an image in the image region RC included in the right image PR. It is to be noted that although the sub-image generation unit 31 may generate the three sub-images PS in this example, this is non-limiting. For example, the sub-image generation unit 31 may generate two sub-images PS, or may generate four or more sub-images PS.

The luminance ratio map generation unit 32 may generate three pieces of luminance ratio map data MAPA, MAPB, and MAPC. The luminance ratio map data MAPA may be regarding a luminance ratio between the left image PL and the sub-image PSA. The luminance ratio map data MAPB may be regarding a luminance ratio between the left image PL and the sub-image PSB. The luminance ratio map data MAPC may be regarding a luminance ratio between the left image PL and the sub-image PSC. For example, the luminance ratio map generation unit 32 may detect corresponding points that correspond to each other, based on the left image PL and the sub-image PSA, for example, by performing template matching. The corresponding points may include an image point in the left image PL and an image point in the sub-image PSA that correspond to each other. The luminance ratio map generation unit 32 may repeat such a process to detect corresponding points. The luminance ratio map generation unit 32 may generate the luminance ratio map data MAPA by calculating the ratios of the luminance values in the respective pixels corresponding to each other in pixel units with use of the detected corresponding points based on the left image PL and the sub-image PSA. In a similar manner, the luminance ratio map generation unit 32 may generate the luminance ratio map data MAPB based on the left image PL and the sub-image PSB, and may generate the luminance ratio map data MAPC based on the left image PL and the sub-image PSC.

The electric heating wire pattern estimation unit 33 may estimate the wiring pattern of the electric heating wire 8 in the imaging range 9L of the left camera 11L and the wiring pattern of the electric heating wire 8 in the imaging range 9R of the right camera 11R out of the electric heating wire 8 provided on the windshield 9, based on the pieces of luminance ratio map data MAPA, MAPB, and MAPC.

The image correction unit 21 may generate a left image PL1 and a right image PR1 by correcting the left image PL and the right image PR based on the wiring pattern of the electric heating wire 8 estimated by the electric heating wire pattern estimation unit 33. For example, the image correction unit 21 may increase respective luminance values of pixels at the position where the wiring pattern of the electric heating wire 8 is present in the left image PL, based on the wiring pattern of the electric heating wire 8 in the imaging range 9L estimated by the electric heating wire pattern estimation unit 33. That is, the image correction unit 21 may increase respective luminance values of pixels at a position corresponding to the line portion 8L illustrated in FIGS. 4 and 6. The image correction unit 21 may generate the left image PL1 by performing such a correction on the left image PL. In a similar manner, for example, the image correction unit 21 may increase respective luminance values of pixels at the position where the wiring pattern of the electric heating wire 8 is present in the right image PR, based on the wiring pattern of the electric heating wire 8 in the imaging range 9R estimated by the electric heating wire pattern estimation unit 33. That is, the image correction unit 21 may increase respective luminance values of pixels at a position corresponding to the line portion 8R illustrated in FIGS. 4 and 6. The image correction unit 21 may generate the right image PR1 by performing such a correction on the right image PR.

The parallax image generation unit 22 may generate a parallax image PD by performing predetermined image processing based on the left image PL1 and the right image PR1. The predetermined image processing may include stereo matching. The parallax image PD may have pixel values. Each of the pixel values may indicate a value regarding a parallax in each pixel. In other words, each of the pixel values may correspond to a distance to a point corresponding to the pixel of interest in a three-dimensional real space.

The parallax image generation unit 22 may include a corresponding point detection unit 23. The corresponding point detection unit 23 may detect corresponding points that correspond to each other by performing stereo matching based on the left image PL1 and the right image PR1. The corresponding points may include an image point in the left image PL1 and an image point in the right image PR1. For example, the corresponding point detection unit 23 may detect the corresponding points by template matching or by feature matching based on local features. The parallax image generation unit 22 may generate the parallax image PD based on a result of the detection performed by the corresponding point detection unit 23.

The object recognition unit 24 may recognize an object in front of the vehicle 10 based on the left image PL1, the right image PR1, and the parallax image PD generated by the parallax image generation unit 22. The object recognition unit 24 may output data regarding a result of the recognition.

In one embodiment, the stereo camera 11 may serve as a "stereo camera". In one embodiment, the sub-image generation unit 31 may serve as a "sub-image generation unit". In one embodiment, for example, the right image PR may serve as a "first image". In one embodiment, the luminance ratio map generation unit 32 may serve as a "luminance ratio map generation unit". In one embodiment, for example, the left image PL may serve as a "second image". In one embodiment, the electric heating wire pattern estimation unit 33 may serve as an "electric heating wire pattern estimation unit". In one embodiment, the image correction unit 21 may serve as an "image correction unit". In one embodiment, the parallax image generation unit 22 and the object recognition unit 24 may serve as a "processing unit".

Example workings and example effects of the image processing apparatus 1 according to the example embodiment will now be described.

First, an outline of an overall operation of the image processing apparatus 1 will be described with reference to FIG. 1. The stereo camera 11 may capture images of the environment in front of the vehicle 10 and thereby generate the stereo image PIC including the left image PL and the right image PR. In the processor 20, the sub-image generation unit 31 of the electric heating wire detection unit 30 may generate the three sub-images PSA, PSB, and PSC by dividing the right image PR in the lateral direction. The luminance ratio map generation unit 32 may generate the three pieces of luminance ratio map data: the luminance ratio map data MAPA regarding the luminance ratio between the left image PL and the sub-image PSA; the luminance ratio map data MAPB regarding the luminance ratio between the left image PL and the sub-image PSB; and the luminance ratio map data MAPC regarding the luminance ratio between the left image PL and the sub-image PSC. The electric heating wire pattern estimation unit 33 may estimate the wiring pattern of the electric heating wire 8 in the imaging range 9L of the left camera 11L and the wiring pattern of the electric heating wire 8 in the imaging range 9R of the right camera 11R out of the electric heating wire 8 provided on the windshield 9, based on the three pieces of luminance ratio map data MAPA, MAPB, and MAPC. The parallax image generation unit 22 may generate the parallax image PD by performing the predetermined image processing, including stereo matching, based on the left image PL1 and the right image PR1. The object recognition unit 24 may recognize the object in front of the vehicle 10 based on the left image PL1, the right image PR1, and the parallax image PD generated by the parallax image generation unit 22.

Figure 8:
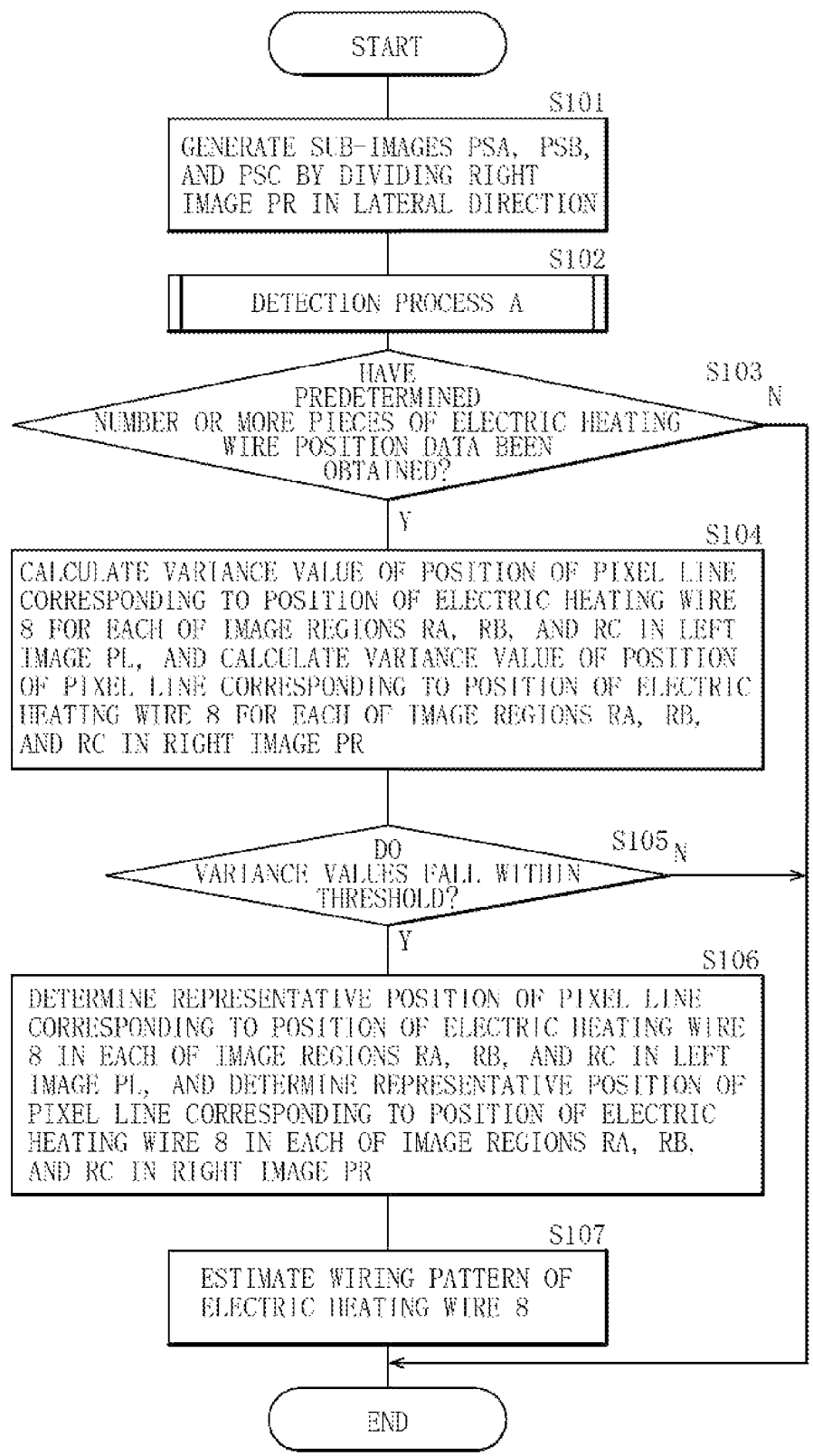
FIG. 8 is a flowchart illustrating an operation example of an electric heating wire detection unit illustrated in FIG. 1.

FIG. 8 illustrates an operation example of the electric heating wire detection unit 30. The electric heating wire detection unit 30 may perform the following process every time the processor 20 receives the stereo image PIC from the stereo camera 11.

First, the sub-image generation unit 31 of the electric heating wire detection unit 30 may generate the three sub-images PSA, PSB, and PSC by dividing the right image PR in the lateral direction as illustrated in FIG. 7 (step S101).

Thereafter, the electric heating wire detection unit 30 may perform a detection process A (step S102). The electric heating wire detection unit 30 may generate electric heating wire position data based on the left image PL and the sub-images PSA, PSB, and PSC. The electric heating wire position data may include data regarding respective positions of the electric heating wire 8 in the left image PL and the right image PR.

Figure 9:
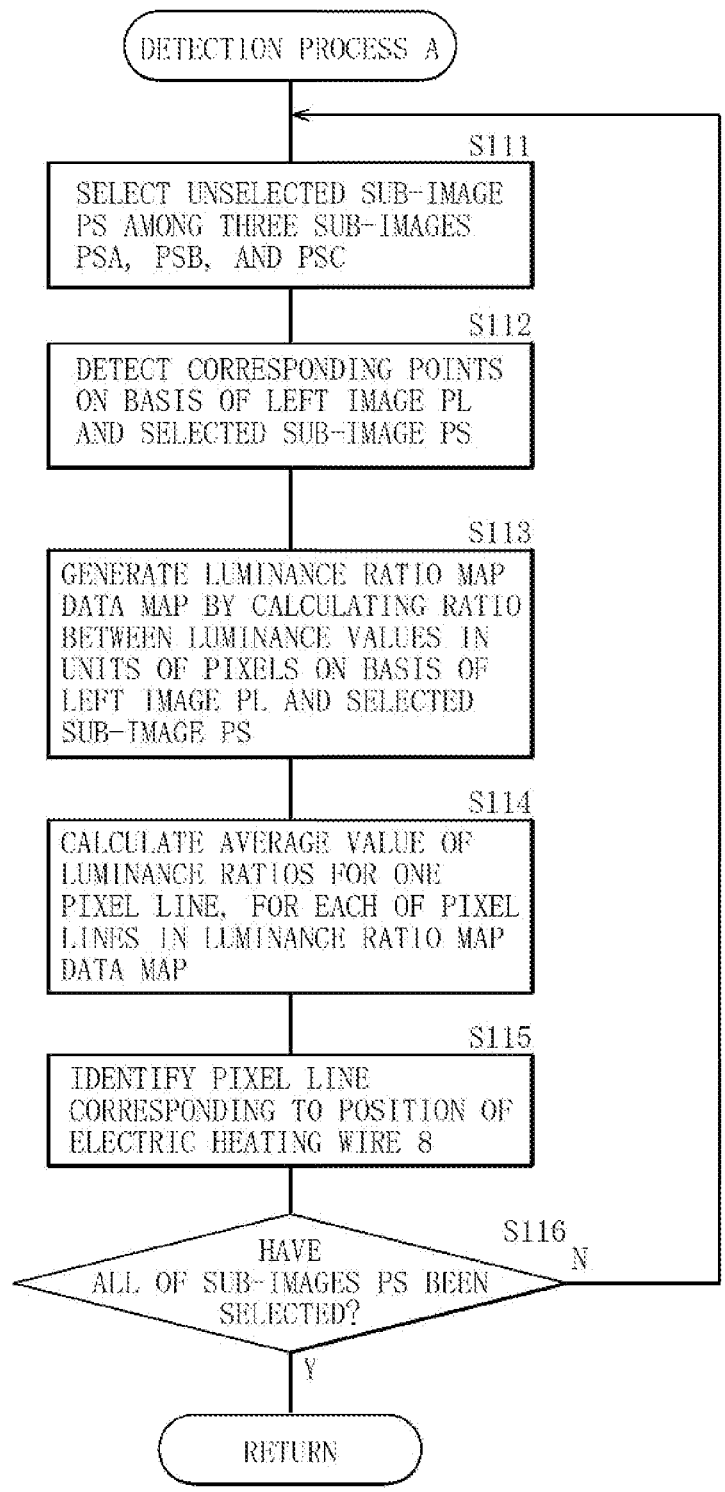
FIG. 9 is a flowchart illustrating an example of a detection process illustrated in FIG. 8.

FIG. 9 illustrates an example of a sub-routine of the detection process A.

First, the luminance ratio map generation unit 32 may select an unselected sub-image PS among the three sub-images PSA, PSB, and PSC generated by the sub-image generation unit 31 (step S111).

Thereafter, the luminance ratio map generation unit 32 may detect corresponding points based on the left image PL and the selected sub-image PS (step S112). For example, the luminance ratio map generation unit 32 may detect corresponding points including an image point in the left image PL and an image point in the selected sub-image PS that correspond to each other. For example, the luminance ratio map generation unit 32 may detect such corresponding points by performing processing such as template matching based on the left image PL and the selected sub-image PS. The luminance ratio map generation unit 32 may detect the corresponding points by repeating the above-described process.

Thereafter, the luminance ratio map generation unit 32 may generate the luminance ratio map data MAP by calculating a ratio between respective luminance values in pixels corresponding to each other in units of pixels with use of the corresponding points obtained in step S112, based on the left image PL and the selected sub-image PS (step S113). In this example, the luminance ratio map generation unit 32 may calculate the ratio between the luminance values by dividing the luminance value of the left image PL by the luminance value of the sub-image PS. The luminance ratio map generation unit 32 may generate the luminance ratio map data MAPA in a case where the selected sub-image PS is the sub-image PSA. The luminance ratio map generation unit 32 may generate the luminance ratio map data MAPB in a case where the selected sub-image PS is the sub-image PSB. The luminance ratio map generation unit 32 may generate the luminance ratio map data MAPC in a case where the selected sub-image PS is the sub-image PSC.

Thereafter, the electric heating wire pattern estimation unit 33 may calculate an average value of the luminance ratios for one pixel line, for each of the pixel lines extending in the lateral direction in the luminance ratio map data MAP generated in step S113 (step S114).

Figure 10:
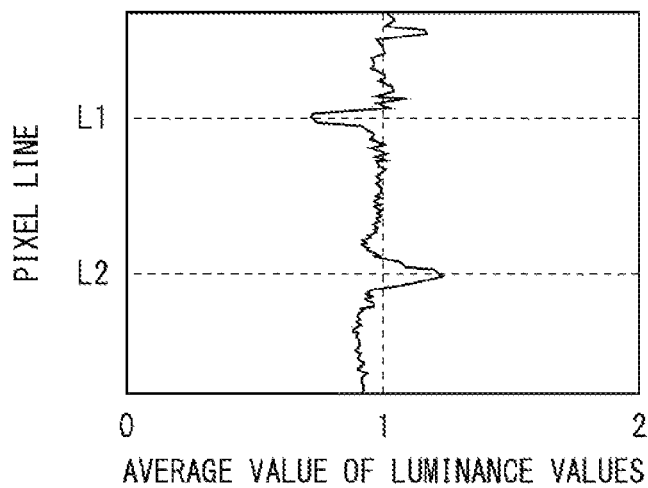
FIG. 10 is a characteristic diagram illustrating a result of a detection performed by the electric heating wire detection unit illustrated in FIG. 1.

FIG. 10 illustrates an example of a distribution of the average values of the luminance ratios in the luminance ratio map data MAP. The average value of the luminance ratio is about "1" in many of the pixel lines. This indicates that the luminance is substantially the same in the pixel in the left image PL and the pixel in the right image PR that correspond to each other. In this example, the average value of the luminance values protrudes in a direction smaller than "1" around the pixel line L1, and protrudes in a direction greater than "1" around the pixel line L2.

Thereafter, the electric heating wire pattern estimation unit 33 may identify a pixel line corresponding to the position of the electric heating wire 8, based on the result obtained in step S114 (step S115). For example, the electric heating wire pattern estimation unit 33 may identify the pixel line corresponding to the position of the electric heating wire 8 based on the result obtained in step S114 with use of a technique such as pattern matching or machine learning.

Figure 11:
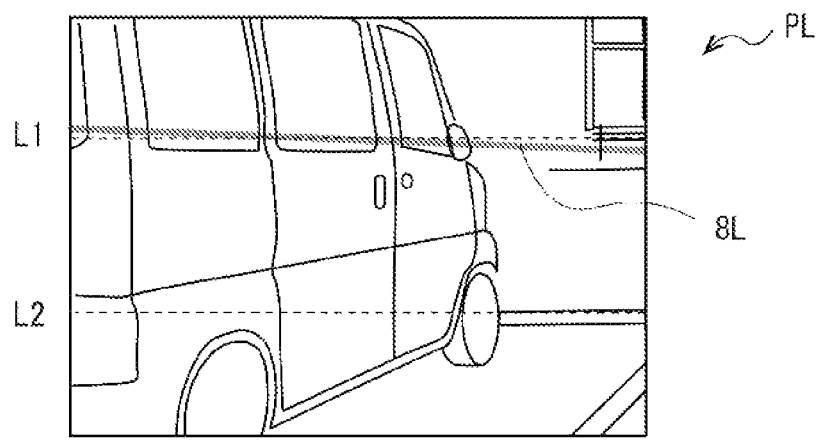
FIG. 11 is an explanatory diagram illustrating an operation example of the electric heating wire detection unit illustrated in FIG. 1.
Figure 12:
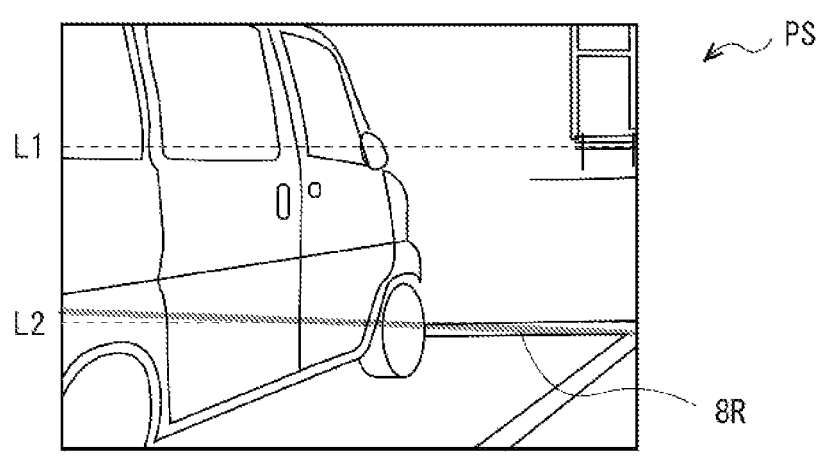
FIG. 12 is another explanatory diagram illustrating the operation example of the electric heating wire detection unit illustrated in FIG. 1.

FIG. 11 illustrates an image in the image region RA in the left image PL illustrated in FIG. 6. FIG. 12 illustrates the sub-image PSA in the image region RA in the right image PR illustrated in FIG. 6. Around the pixel line L1, the line portion 8L is present in the left image PL but the line portion 8R is not present in the right image PR (the sub-image PS). This corresponds to that the average value of the luminance ratios protrudes in the direction smaller than "1" around the pixel line L1 in FIG. 10. Around the pixel line L2, the line portion 8R is present in the right image PR (the sub-image PS) but the line portion 8L is not present in the left image PL. This corresponds to that the average value of the luminance ratios protrudes in the direction greater than "1" around the pixel line L2 in FIG. 10.

In such a manner, the electric heating wire pattern estimation unit 33 may identify the pixel line corresponding to the position of the electric heating wire 8 in the left image PL and may also identify the pixel line corresponding to the position of the electric heating wire 8 in the sub-image PS that is a portion of the right image PR.

In a case where the left image PL and the right image PR are color images, the electric heating wire detection unit 30 may perform the processes in steps S112 to S115 based on a luminance value of red (R), a luminance value of green (G), and a luminance value of blue (B). For example, first, in step S112, the luminance ratio map generation unit 32 may detect corresponding points based on a red image of the left image PL and a red image of the selected sub-image PS. In step S113, the luminance ratio map generation unit 32 may generate luminance ratio map data regarding a ratio between luminance values of red, based on the red image of the left image PL and the red image of the sub-image PS. In step S114, the electric heating wire pattern estimation unit 33 may calculate an average value of luminance ratios for one pixel line, for each of the pixel lines in the generated luminance ratio map data related to red. In such a manner, the electric heating wire pattern estimation unit 33 may obtain a distribution of the average values of the luminance ratios related to red as illustrated in FIG. 10. In a similar manner, the electric heating wire detection unit 30 may obtain a distribution of average values of luminance ratios related to green and a distribution of average values of luminance ratios related to blue. In step S115, the electric heating wire pattern estimation unit 33 may identify the pixel line corresponding to the position of the electric heating wire 8 based on the distribution of the average values of the luminance ratios related to red, the distribution of the average values of the luminance ratios related to green, and the distribution of the average values of the luminance ratios related to blue. It is to be noted that although the example regarding the RGB color space has been described above, this example is non-limiting. Alternatively, the color space may be any other color space such as a YUV color space. In addition, the left image PL and the right image PR may be monochrome images.

Thereafter, the electric heating wire detection unit 30 may check whether all of the sub-images PS have been selected in step S111 (step S116). If not all of the sub-images PS have been selected ("N" in step S116), the process may return to step S111 and the processes in steps S111 to S116 may be repeated until all of the sub-images PS are selected. If all of the sub-images PS have been selected ("Y" in step S116), the sub-routine of the detection process A may end.

In such a manner, the electric heating wire detection unit 30 may identify the pixel line corresponding to the position of the electric heating wire 8 in each of the three image regions RA to RC in the left image PL and also identify the pixel line corresponding to the position of the electric heating wire 8 in each of the three image regions RA to RC in the right image PR, based on the left image PL and right image PR included in one stereo image PIC. The electric heating wire detection unit 30 may store data regarding the identified pixel lines as the electric heating wire position data.

Thereafter, as illustrated in FIG. 8, the electric heating wire pattern estimation unit 33 may check whether a predetermined number or more pieces of electric heating wire position data have been obtained (step S103). If the predetermined number or more pieces of electric heating wire position data have not been obtained yet ("N" in step S103), this flow may end. The process illustrated in FIG. 8 may be performed every time the processor 20 receives the stereo image PIC from the stereo camera 11. Thus, the pixel line corresponding to the position of the electric heating wire 8 may be identified based on each of the sequentially received stereo images PIC, and the corresponding pieces of electric heating wire position data may be sequentially stored. The pieces of electric heating wire position data may be accumulated in such a manner.

If the predetermined number or more pieces of electric heating wire position data have been obtained in step S103 ("Y" in step S103), the electric heating wire pattern estimation unit 33 may calculate a variance value of the position of the pixel line corresponding to the position of the electric heating wire 8 for each of the image regions RA, RB, and RC in the left image PL based on the accumulated pieces of electric heating wire position data, and may also calculate a variance value of the position of the pixel line corresponding to the position of the electric heating wire 8 for each of the image regions RA, RB, and RC in the right image PR based on the accumulated pieces of electric heating wire position data (step S104).

Thereafter, the electric heating wire pattern estimation unit 33 may check whether all of the six variance values obtained in step S104 fall within a predetermined threshold (step S105). If this condition is not satisfied ("N" in step S105), this flow may end.

If all of the six variance values obtained in step S104 fall within the predetermined threshold in step S105 ("Y" in step S105), the electric heating wire pattern estimation unit 33 may determine a representative position of the pixel line corresponding to the position of the electric heating wire 8 in each of the image regions RA, RB, and RC in the left image PL based on the accumulated pieces of electric heating wire position data, and may also determine a representative position of the pixel line corresponding to the position of the electric heating wire 8 in each of the image regions RA, RB, and RC in the right image PR based on the accumulated pieces of electric heating wire position data (step S106). For example, the representative value may be an average position, or may be a position corresponding to a mode value in a case of generating a histogram regarding the position of the electric heating wire 8.

Figure 13:
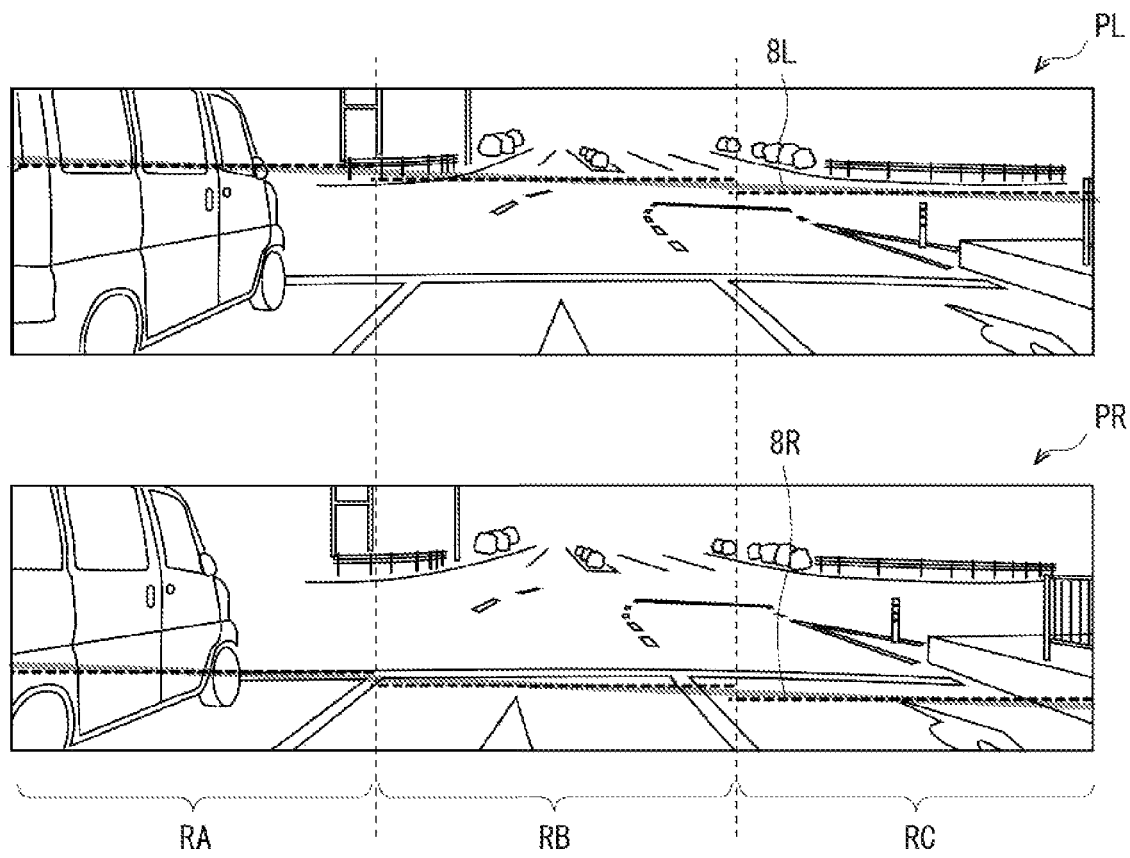
FIG. 13 is still another explanatory diagram illustrating the operation example of the electric heating wire detection unit illustrated in FIG. 1.

FIG. 13 illustrates the representative position of the pixel line obtained in step S106. In this example, the left image PL and the right image PR are substantially the same as the images illustrated in FIG. 6. Thick dotted lines each indicate the pixel line indicated by the representative position. In the left image PL, the pixel line indicated by the representative position is present on the upper side in the upper-lower direction in the left image PL in each of the image regions RA, RB, and RC. In the left image PL, the pixel line in the image region RA is positioned at the top, and the pixel line in the image region RC is positioned at the bottom. The respective pixel lines in the image regions RA, RB, and RC are positioned along the line portion 8L that has the luminance lower than the luminance in the region surrounding the line portion 8L. In the right image PR, the pixel line indicated by the representative position is present on the lower side in the upper-lower direction in the right image PR in each of the image regions RA, RB, and RC. In the right image PR, the pixel line in the image region RA is positioned at the top, and the pixel line in the image region RC is positioned at the bottom. The respective pixel lines in the image regions RA, RB, and RC are positioned along the line portion 8R that has the luminance lower than the luminance in the region surrounding the line portion 8R.

Thereafter, the electric heating wire pattern estimation unit 33 may estimate the wiring pattern of the electric heating wire 8 based on the representative positions of the pixel lines obtained in step S106 (step S107). As illustrated in FIG. 13, in the left image PL, the three respective pixel lines indicated by the representative positions are positioned along the line portion 8L that has the luminance lower than the luminance in the region surrounding the line portion 8L. Therefore, the electric heating wire pattern estimation unit 33 may be able to obtain the position and the direction of the line portion 8L based on these representative positions. Accordingly, the electric heating wire pattern estimation unit 33 may be able to estimate the wiring pattern of the electric heating wire 8 in the imaging range 9L of the left camera 11L. Similarly, in the right image PR, the three respective pixel lines indicated by the representative positions are positioned along the line portion 8R that has the luminance lower than the luminance in the region surrounding the line portion 8R. Therefore, the electric heating wire pattern estimation unit 33 may be able to obtain the position and the direction of the line portion 8R based on these representative positions. Accordingly, the electric heating wire pattern estimation unit 33 may be able to estimate the wiring pattern of the electric heating wire 8 in the imaging range 9R of the right camera 11R. The wiring pattern of the electric heating wire 8 may be able to be expressed by a function, for example.

This may be the end of this flow.

As described above, the electric heating wire detection unit 30 may estimate the wiring pattern of the electric heating wire 8. The image correction unit 21 may generate the left image PL1 and the right image PR1 by correcting the left image PL and the right image PR based on the wiring pattern of the electric heating wire 8 estimated by the electric heating wire pattern estimation unit 33. For example, the image correction unit 21 may increase the respective luminance values of the pixels at the position of the wiring pattern of the electric heating wire 8 in the left image PL, based on the wiring pattern of the electric heating wire 8 in the imaging range 9L estimated by the electric heating wire pattern estimation unit 33. That is, the image correction unit 21 may increase the respective luminance values of the pixels at the position corresponding to the line portion 8L illustrated in FIGS. 4 and 6. The image correction unit 21 may generate the left image PL1 by performing such a correction on the left image PL. In a similar manner, for example, the image correction unit 21 may increase the respective luminance values of the pixels at the position of the wiring pattern of the electric heating wire 8 in the right image PR, based on the wiring pattern of the electric heating wire 8 in the imaging range 9R estimated by the electric heating wire pattern estimation unit 33. That is, the image correction unit 21 may increase the respective luminance values of the pixels at the position corresponding to the line portion 8R illustrated in FIGS. 4 and 6. The image correction unit 21 may generate the right image PR1 by performing such a correction on the right image PR.

As described above, the image processing apparatus 1 includes the sub-image generation unit 31, the luminance ratio map generation unit 32, and the electric heating wire pattern estimation unit 33. The sub-image generation unit 31 may generate three sub-images PS by dividing the right image PR in the lateral direction. The right image PR may be one of the left image PL and the right image PR. The left image PL and the right image PR may be captured by the stereo camera 11 through the windshield 9 provided with the electric heating wire 8. The luminance ratio map generation unit 32 may sequentially select one of the three sub-images PS and generate luminance ratio map data MAP regarding a ratio between luminance values based on the selected sub-image PS and the left image PL. The left image PL may be another of the left image PL and the right image PR. The electric heating wire pattern estimation unit 33 may perform an estimation of the wiring pattern of the electric heating wire 8 based on the luminance ratio map data MAP regarding each of the three sub-images PS. Accordingly, in the image processing apparatus 1, for example, the image correction unit 21 may be able to correct the left image PL and the right image PR based on the result of the estimation of the wiring pattern of the electric heating wire 8. This makes it possible to suppress an influence of the electric heating wire 8 on the corrected left image PL and the corrected right image PR. In addition, it is possible to reduce an influence of the electric heating wire 8 on various kinds of image processing based on the corrected left image PL and the corrected right image PR. According to the image processing apparatus 1, it is thus possible to reduce an influence of the electric heating wire 8 on a processing result of image processing.

In the image processing apparatus 1, the three sub-images PS may include a first sub-image (e.g., the sub-image PSA) and a second sub-image (e.g., the sub-image PSC). The electric heating wire pattern estimation unit 33 may calculate first representative values for respective pixel lines in the luminance ratio map data MAP (e.g., the luminance ratio map data MAPA) regarding the first sub-image (e.g., the sub-image PSA). The first representative values may each be a representative value of luminance ratios for one pixel line. The pixel lines may extend in the lateral direction. The electric heating wire pattern estimation unit 33 may calculate second representative values for respective pixel lines in the luminance ratio map data MAP (e.g., the luminance ratio map data MAPC) regarding the second sub-image (e.g., the sub-image PSC). The second representative values may each be a representative value of luminance ratios for one pixel line. The pixel lines may extend in the lateral direction. The electric heating wire pattern estimation unit 33 may perform an estimation of the wiring pattern of the electric heating wire 8 based on two or more of the first representative values and two or more of the second representative values. According to the image processing apparatus 1, for example, as illustrated in FIG. 10, the distribution of the representative value of the luminance values illustrated in FIG. 10 is thus obtainable, for example, in the image region RA of the sub-image PSA and the image region RC of the sub-image PSC. Accordingly, it is possible to estimate, for example, the wiring pattern of the electric heating wire 8 in the imaging range 9R of the right camera 11R by identifying the pixel line having the representative value of the luminance values that protrudes in the direction greater than "1". In a similar manner, it is possible to estimate, for example, the wiring pattern of the electric heating wire 8 in the imaging range 9L of the left camera 11L by identifying the pixel line having the representative value of the luminance values that protrudes in the direction smaller than "1". In addition, it is possible to estimate the inclined wiring pattern as illustrated in FIG. 13. As a result, according to the image processing apparatus 1, for example, the image correction unit 21 may be able to correct the left image PL and the right image PR based on the result of the estimation of the wiring pattern of the electric heating wire 8. This makes it possible to suppress an influence of the electric heating wire 8 on the corrected left image PL and the corrected right image PR.

As described above, according to the example embodiment, an image processing apparatus includes a sub-image generation unit, a luminance ratio map generation unit, and an electric heating wire pattern estimation unit. The sub-image generation unit may be configured to generate three sub-images by dividing a right image in a lateral direction. The right image may be one of a left image and the right image. The left image and the right image may be captured by a stereo camera through a windshield provided with an electric heating wire. The luminance ratio map generation unit may be configured to sequentially select one of the three sub-images and generate luminance ratio map data regarding a ratio between luminance values based on the selected sub-image and the left image. The left image may be another of the left image and the right image. The electric heating wire pattern estimation unit may be configured to perform an estimation of a wiring pattern of the electric heating wire based on the luminance ratio map data regarding each of the three sub-images. For example, this makes it possible to correct the left image and the right image based on the result of the estimation of the wiring pattern of the electric heating wire. Accordingly, it is possible to reduce an influence of the electric heating wire on a processing result of image processing.

According to the example embodiment, the three sub-images may include a first sub-image and a second sub-image. The electric heating wire pattern estimation unit may be configured to calculate first representative values for respective pixel lines in the luminance ratio map data regarding the first sub-image. The first representative values may each be a representative value of luminance ratios for one pixel line. The pixel lines may extend in the lateral direction. The electric heating wire pattern estimation unit may be configured to calculate second representative values for respective pixel lines in the luminance ratio map data regarding the second sub-image. The second representative values may each be a representative value of luminance ratios for one pixel line. The pixel lines may extend in the lateral direction. The electric heating wire pattern estimation unit may be configured to perform the estimation of the wiring pattern of the electric heating wire based on two or more of the first representative values and two or more of the second representative values. This makes it possible to estimate the wiring pattern of the electric heating wire. Accordingly, it is possible to reduce an influence of the electric heating wire on a processing result of image processing.

Figure 14:
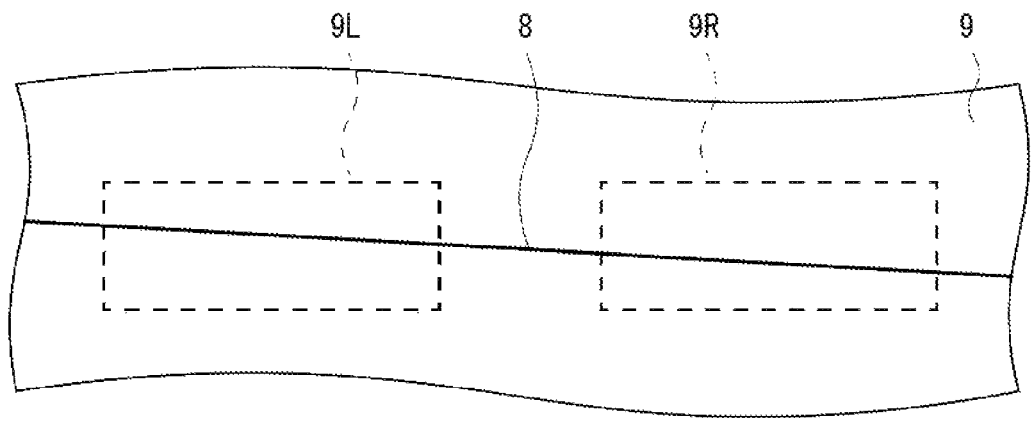
FIG. 14 is an explanatory diagram illustrating an example of the wiring pattern of the electric heating wire according to a modification.

In the example embodiment described above, the electric heating wire 8 may have the wiring pattern as illustrated in FIG. 3; however, this is non-limiting. The electric heating wire 8 may have various asymmetrical wiring patterns. For example, as illustrated in FIG. 14, the electric heating wire 8 may have a straight-line shape that passes through the imaging range 9L and the imaging range 9R and extends obliquely. In this case also, the wiring pattern of the electric heating wire 8 may be different between the imaging range 9L and the imaging range 9R, and the wiring pattern of the electric heating wire 8 in the imaging range 9L and the imaging range 9R may be asymmetrical.

Figure 15:
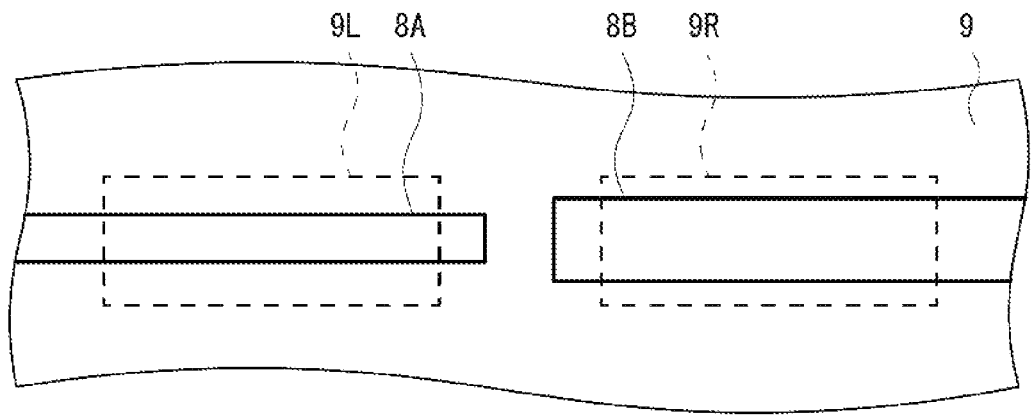
FIG. 15 is an explanatory diagram illustrating an example of the wiring pattern of the electric heating wire according to another modification.

Alternatively, for example, as illustrated in FIG. 15, the electric heating wire 8 may be individually provided in each of the imaging range 9L and the imaging range 9R. The electric heating wire 8 may include an electric heating wire 8A and an electric heating wire 8B. The electric heating wire 8A may be provided in the imaging range 9L. The electric heating wire 8B may be provided in the imaging range 9R. The electric heating wire 8A may have a shape that is provided across the imaging range 9L and runs in one direction of a left-right direction and returns in another direction of the left-right direction in the imaging range 9L. The electric heating wire 8B may have a shape that is provided across the imaging range 9R and runs in one direction of the left-right direction and returns in another direction of the left-right direction in the imaging range 9R. In this case also, the wiring pattern of the electric heating wire 8 may be different between the imaging range 9L and the imaging range 9R, and the wiring pattern of the electric heating wire 8 in the imaging range 9L and the imaging range 9R may be asymmetrical.

Figure 16:
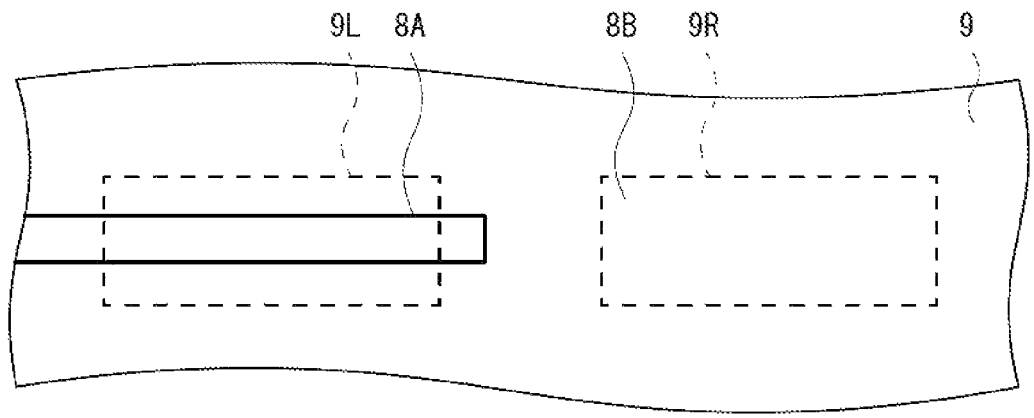
FIG. 16 is an explanatory diagram illustrating an example of the wiring pattern of the electric heating wire according to still another modification.

Alternatively, for example, as illustrated in FIG. 16, the electric heating wire 8 may be provided in one of the imaging range 9L and the imaging range 9R. In this example, the electric heating wire 8 may be provided in the imaging range 9L but may not be provided in the imaging range 9R. The electric heating wire 8 may have a shape that is provided across the imaging range 9L and runs in one direction of the left-right direction and returns in another direction of the left-right direction in the imaging range 9L.

In the example embodiment described above, the sub-image generation unit 31 may generate the sub-images PS by dividing the right image PR in the lateral direction. In addition, the luminance ratio map generation unit 32 may generate the three pieces of luminance ratio map data: the luminance ratio map data MAPA regarding the luminance ratio between the left image PL and the sub-image PSA; the luminance ratio map data MAPB regarding the luminance ratio between the left image PL and the sub-image PSB; and the luminance ratio map data MAPC regarding the luminance ratio between the left image PL and the sub-image PSC. However, this is non-limiting. Alternatively, the sub-image generation unit 31 may generate sub-images PS by dividing the left image PL in the lateral direction. In addition, the luminance ratio map generation unit 32 may generate three pieces of luminance ratio map data: luminance ratio map data MAPA regarding a luminance ratio between the right image PR and the sub-image PSA; luminance ratio map data MAPB regarding a luminance ratio between the right image PR and the sub-image PSB; and luminance ratio map data MAPC regarding a luminance ratio between the right image PR and the sub-image PSC.

In the example embodiment described above, the image correction unit 21 may be provided. The image correction unit 21 may correct the left image PL and the right image PR based on the wiring pattern of the electric heating wire 8 estimated by the electric heating wire pattern estimation unit 33. However, this is non-limiting. An image processing apparatus 1C according to Modification 3 will be described below in detail.

Figure 17:
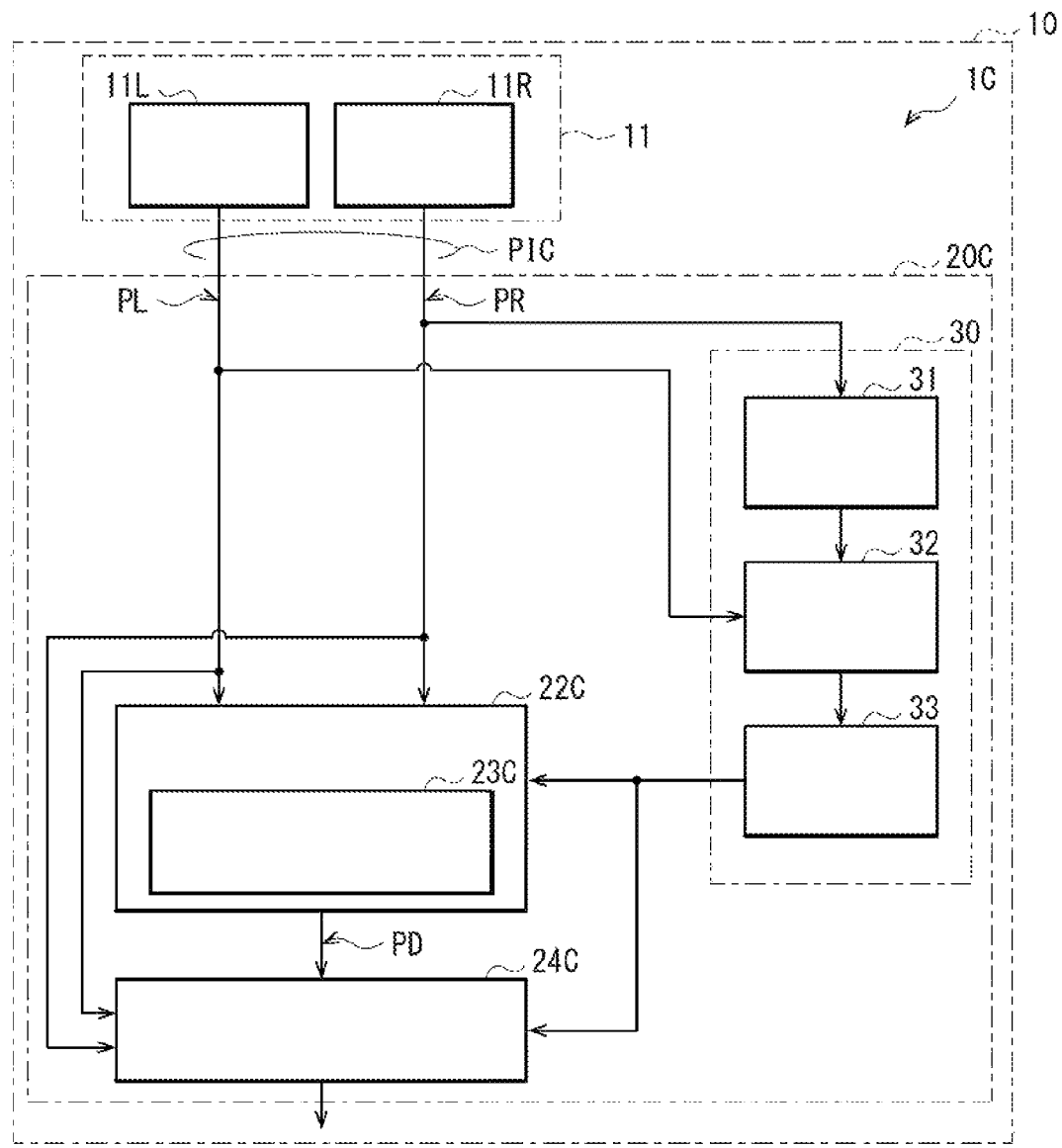
FIG. 17 is a block diagram illustrating a configuration example of an image processing apparatus according to still another modification.

FIG. 17 illustrates a configuration example of the image processing apparatus 1C. The image processing apparatus 1C may include a processor 20C. The processor 20 may include the electric heating wire detection unit 30, a parallax image generation unit 22C, and an object recognition unit 24C. In other words, the processor 20C may correspond to the processor 20 according to the above-described example embodiment illustrated in FIG. 1 in which the image correction unit 21 is omitted and the parallax image generation unit 22 and the object recognition unit 24 are replaced by the parallax image generation unit 22C and the object recognition unit 24C, respectively.

As with the parallax image generation unit 22 according to the above-described example embodiment, the parallax image generation unit 22C may generate the parallax image PD by performing the predetermined image processing based on the left image PL and the right image PR. The predetermined image processing may include stereo matching.

The parallax image generation unit 22C may include a corresponding point detection unit 23C. The corresponding point detection unit 23C may detect corresponding points that correspond to each other by performing stereo matching based on the left image PL and the right image PR. The corresponding points may include an image point in the left image PL and an image point in the right image PR. If a matching condition regarding the stereo matching is satisfied, the corresponding point detection unit 23C may detect the corresponding points that correspond to each other, including the image point in the left image PL and the image point in the right image PR. Based on the wiring pattern of the electric heating wire 8 estimated by the electric heating wire pattern estimation unit 33, the corresponding point detection unit 23C may ease the matching condition for a region around the estimated wiring pattern. For example, as illustrated in FIGS. 4 and 6, the position of the line portion 8L in the left image PL and the position of the line portion 8R in the right image PR may be different from each other. This can raise a possibility that detection of the corresponding points by stereo matching becomes more difficult. The corresponding point detection unit 23C may therefore ease the matching condition for the region around the wiring pattern of the electric heating wire 8 to reduce the possibility that the detection of the corresponding points becomes more difficult. The corresponding point detection unit 23C is thus able to effectively perform the stereo matching also in a case where the line portions 8L and 8R are present.

The object recognition unit 24C may recognize an object in front of the vehicle 10 based on the left image PL, the right image PR, and the parallax image PD generated by the parallax image generation unit 22C. The object recognition unit 24C may recognize the object in a case where a predetermined processing condition is satisfied. Based on the wiring pattern of the electric heating wire 8 estimated by the electric heating wire pattern estimation unit 33, the object recognition unit 24C may ease the processing condition for a region around the estimated wiring pattern. There can be a possibility that recognition of the object becomes more difficult in a region around the line portion 8L in the left image PL and in a region around the line portion 8R in the right image PR. The object recognition unit 24C may therefore ease the processing condition for the region around the wiring pattern of the electric heating wire 8 to reduce the possibility that the recognition of the object becomes more difficult. The object recognition unit 24C is thus able to effectively recognize the object also in the case where the line portions 8L and 8R are present.

In one embodiment, the parallax image generation unit 22C and the object recognition unit 24C may serve as the "processing unit".

Two or more of the above-described modifications may be combined.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the example embodiment described above, the stereo camera 11 may capture an image of the environment in front of the vehicle 10; however, this is non-limiting. Alternatively, for example, the stereo camera 11 may capture an image of an environment on a side or behind the vehicle 10.

It is to be noted that the effects described herein are merely illustrative and non-limiting, and other effects may be obtained.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 20 illustrated in FIG. 1.

The invention claimed is:

1. An image processing apparatus comprising:
   a sub-image generation unit configured to generate sub-images by dividing a first image in a lateral direction, the first image being one of a left image and a right image, the left image and the right image being captured by a stereo camera through a windshield provided with an electric heating wire;
   a luminance ratio map generation unit configured to sequentially select one of the sub-images and generate map data based on the selected sub-image and a second image, the map data indicating a ratio between luminance values, the second image being another of the left image and the right image; and
   an electric heating wire pattern estimation unit configured to perform an estimation of a wiring pattern of the electric heating wire based on the map data regarding each of the sub-images.

2. The image processing apparatus according to claim 1, wherein
   the sub-images comprise a first sub-image and a second sub-image, and
   the electric heating wire pattern estimation unit is configured to
      calculate first representative values for respective pixel lines in the map data regarding the first sub-image, the first representative values each being a representative value of luminance ratios for one pixel line, the pixel lines extending in the lateral direction,
      calculate second representative values for respective pixel lines in the map data regarding the second sub-image, the second representative values each being a representative value of luminance ratios for one pixel line, the pixel lines extending in the lateral direction, and perform the estimation of the wiring pattern of the electric heating wire based on two or more of the first representative values and two or more of the second representative values.

3. The image processing apparatus according to claim 2, further comprising:
an image correction unit configured to correct an image portion related to the wiring pattern of the electric heating wire in the left image and an image portion related to the wiring pattern of the electric heating wire in the right image based on a result of the estimation performed by the electric heating wire pattern estimation unit; and
a processing unit configured to perform predetermined image processing based on the left image corrected by the image correction unit and the right image corrected by the image correction unit.

4. The image processing apparatus according to claim 3, wherein the wiring pattern of the electric heating wire in an imaging range of a left camera and an imaging range of a right camera is asymmetrical, the left camera being configured to generate the left image, the right camera being configured to generate the right image.

5. The image processing apparatus according to claim 2, further comprising
a processing unit configured to perform predetermined image processing based on the left image and the right image in a case where a predetermined processing condition is satisfied, wherein
the processing unit is configured to ease the processing condition for an image portion related to the wiring pattern of the electric heating wire in the left image and an image portion related to the wiring pattern of the electric heating wire in the right image based on a result of the estimation performed by the electric heating wire pattern estimation unit.

6. The image processing apparatus according to claim 5, wherein the wiring pattern of the electric heating wire in an imaging range of a left camera and an imaging range of a right camera is asymmetrical, the left camera being configured to generate the left image, the right camera being configured to generate the right image.

7. The image processing apparatus according to claim 2, wherein the wiring pattern of the electric heating wire in an imaging range of a left camera and an imaging range of a right camera is asymmetrical, the left camera being configured to generate the left image, the right camera being configured to generate the right image.

8. The image processing apparatus according to claim 1, further comprising:
an image correction unit configured to correct an image portion related to the wiring pattern of the electric heating wire in the left image and an image portion related to the wiring pattern of the electric heating wire in the right image based on a result of the estimation performed by the electric heating wire pattern estimation unit; and
a processing unit configured to perform predetermined image processing based on the left image corrected by the image correction unit and the right image corrected by the image correction unit.

9. The image processing apparatus according to claim 8, wherein the wiring pattern of the electric heating wire in an imaging range of a left camera and an imaging range of a right camera is asymmetrical, the left camera being configured to generate the left image, the right camera being configured to generate the right image.

10. The image processing apparatus according to claim 1, further comprising
a processing unit configured to perform predetermined image processing based on the left image and the right image in a case where a predetermined processing condition is satisfied, wherein
the processing unit is configured to ease the processing condition for an image portion related to the wiring pattern of the electric heating wire in the left image and an image portion related to the wiring pattern of the electric heating wire in the right image based on a result of the estimation performed by the electric heating wire pattern estimation unit.

11. The image processing apparatus according to claim 10, wherein the wiring pattern of the electric heating wire in an imaging range of a left camera and an imaging range of a right camera is asymmetrical, the left camera being configured to generate the left image, the right camera being configured to generate the right image.

12. The image processing apparatus according to claim 1, wherein the wiring pattern of the electric heating wire in an imaging range of a left camera and an imaging range of a right camera is asymmetrical, the left camera being configured to generate the left image, the right camera being configured to generate the right image.

13. An image processing apparatus comprising
circuitry configured to
generate sub-images by dividing a first image in a lateral direction, the first image being one of a left image and a right image, the left image and the right image being captured by a stereo camera through a windshield provided with an electric heating wire,
sequentially select one of the sub-images and generate map data based on the selected sub-image and a second image, the map data indicating a ratio between luminance values, the second image being another of the left image and the right image, and
perform an estimation of a wiring pattern of the electric heating wire based on the map data regarding each of the sub-images.

* * * * *